S. O. BJORNBERG.
METHOD AND MACHINE FOR FORMING TEETH IN SAWS.
APPLICATION FILED APR. 7, 1919.
1,372,738. Patented Mar. 29, 1921.
3 SHEETS—SHEET 1.
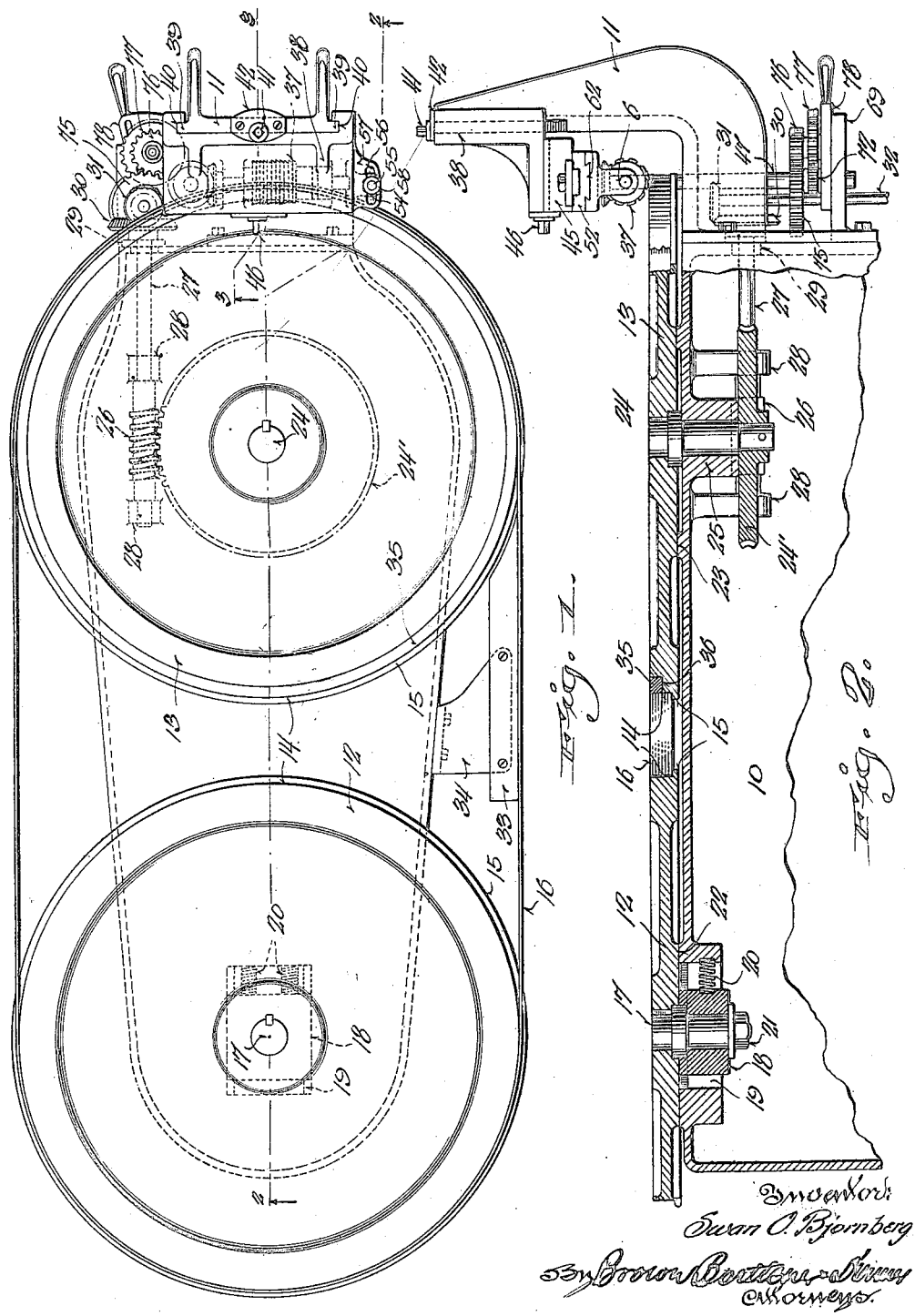

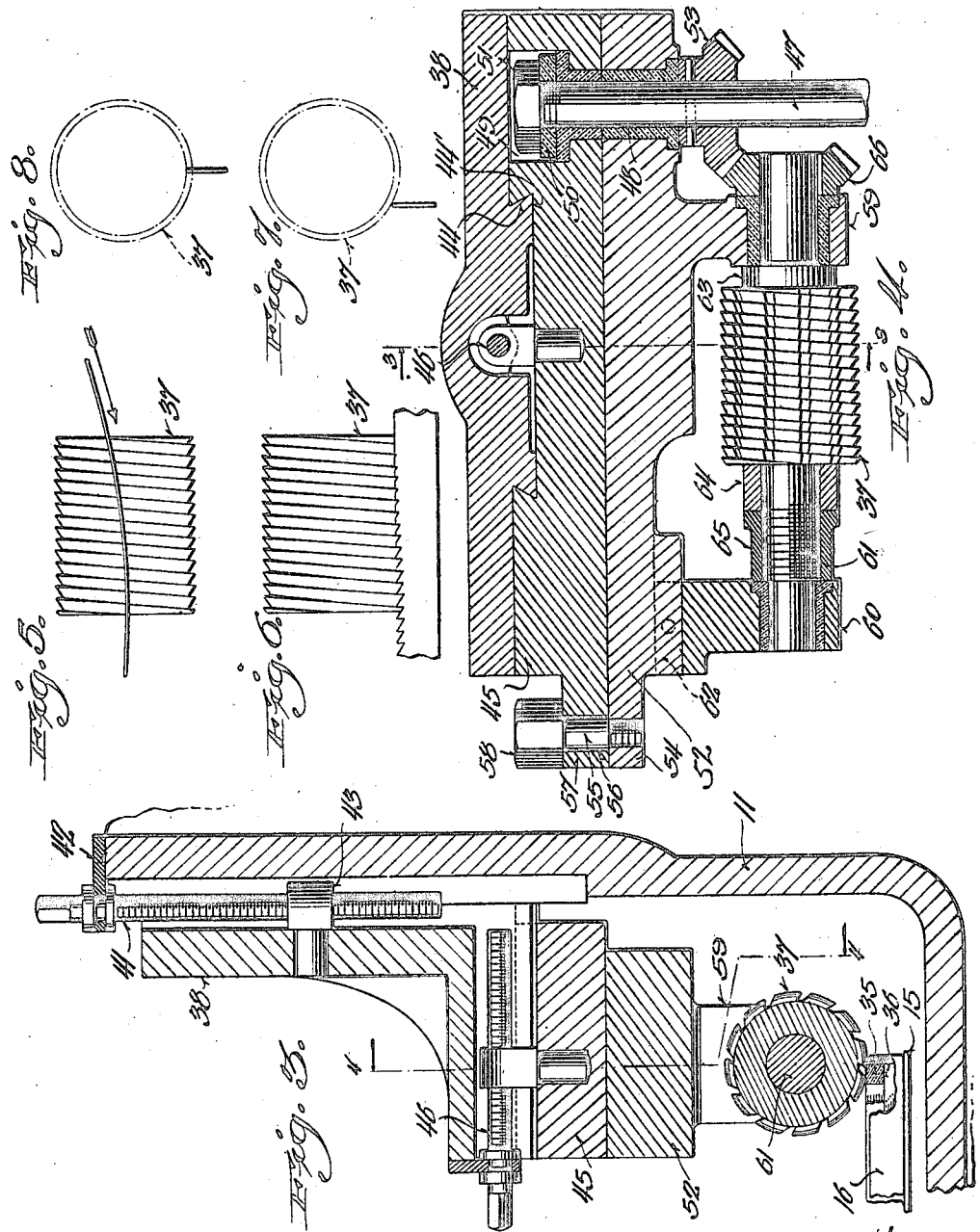

S. O. BJORNBERG.
METHOD AND MACHINE FOR FORMING TEETH IN SAWS.
APPLICATION FILED APR. 7, 1919.
1,372,738.
Patented Mar. 29, 1921.
3 SHEETS—SHEET 3.
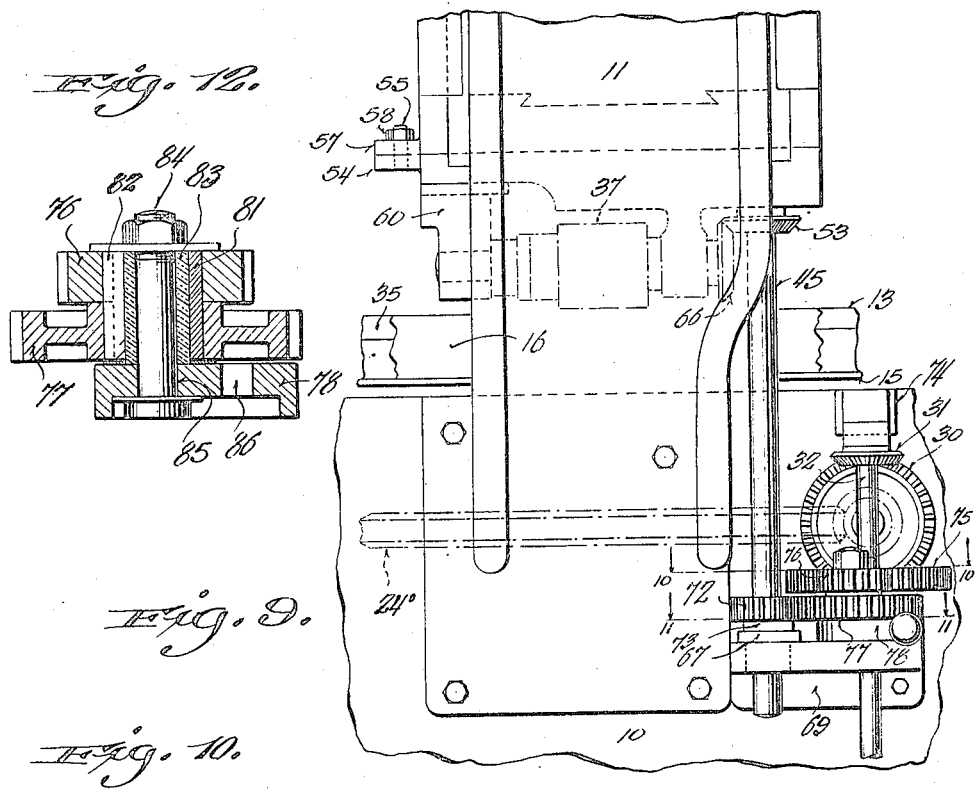
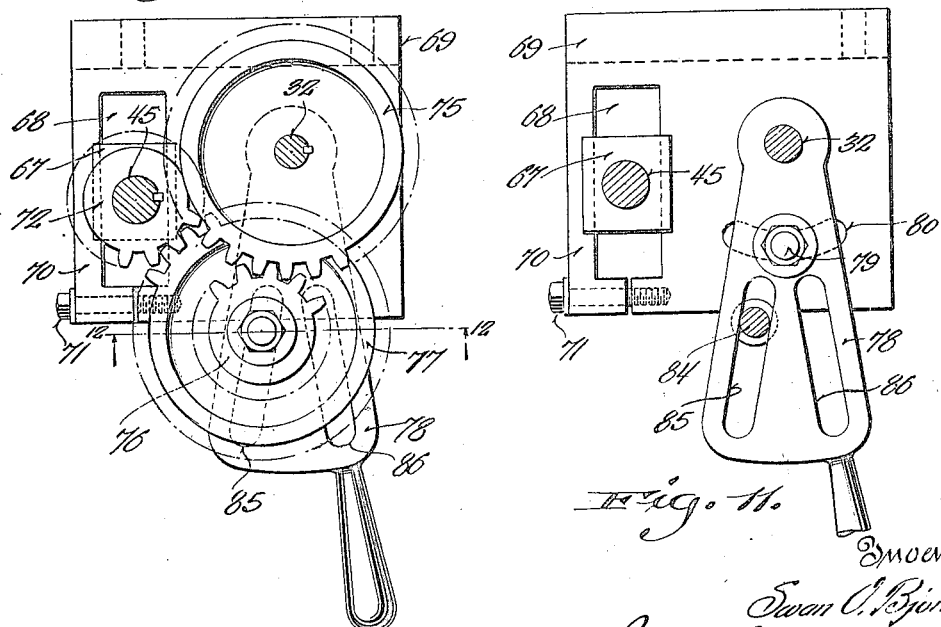

UNITED STATES PATENT OFFICE.

SWAN O. BJORNBERG, OF CHICAGO, ILLINOIS.

METHOD AND MACHINE FOR FORMING TEETH IN SAWS.

1,372,738.  Specification of Letters Patent.  Patented Mar. 29, 1921.

Application filed April 7, 1919. Serial No. 288,093.

*To all whom it may concern:*

Be it known that I, SWAN O. BJORNBERG, a citizen of the United States, residing at Chicago, in the county of Cook and State of Illinois, have invented a certain new and useful Improvement in Methods and Machines for Forming Teeth in Saws, of which the following is a full, clear, concise, and exact description, reference being had to the accompanying drawings, forming a part of this specification.

This invention relates to the manufacture of saws. More particularly, it relates to improvements in the method and means for forming the teeth in saw blades.

The method and machine hereinafter described is particularly adapted for cutting the teeth in hack-saw blades, although the invention may be employed in the formation of teeth in saws of other types.

Heretofore, it has been common practice to form teeth in hack-saw blanks by the use of a milling cutter, which is caused to pass transversely across the edge of the blank while the blank is firmly clamped in fixed position. Notches are thus formed in the edge of the blank, leaving upstanding teeth. It is essential that the teeth of the saw be uniformly shaped and uniformly spaced. By this old method the shape and position of the several teeth produced depends upon the shape and relative position of the several lines of cutting teeth comprising the cutter. In order to provide a cutter of sufficient length to form all the teeth in a saw blank at one operation, the cutter is built up of a plurality of cylindrical sections rigidly secured together. Any inaccuracy in the positioning of the several sections, results in the production of inaccurately shaped teeth. This not infrequently happens and the saws thus formed must often be discarded.

One object of this invention is to provide a practical method by which each saw tooth in its formation, is subjected to precisely the same treatment as the other teeth in the saw whereby uniform teeth are formed.

In carrying out the old method, a plurality of blanks are usually clamped face to face in block formation, with their longitudinal edges in a common plane. The cutter is then caused to pass along the plane of the edges in a direction transversely of the blanks, and thus cut teeth in all of the blanks during one cutting operation.

The number of blanks which can be thus operated upon at one time is limited, however, because of the difficulty in holding them in proper working position. Furthermore, considerable care must be exercised to see that the blanks are properly positioned and to insure that each is firmly clamped. Thus, by this old method considerable time is consumed in the removal of the cut blanks from the machine after one cutting operation, and in replacing uncut blanks therein preparatory to the next succeeding operation.

Another object of this invention is to provide an improved method whereby teeth may be formed in an indefinite number of blanks without interrupting the cutting operation.

Another object is to provide an improved method of manipulating the blanks during the teeth forming operation, whereby teeth are formed in successive blanks by a cutting action which progresses lengthwise of the blanks.

Another object is to provide a method of presenting the blanks to a rotating milling cutter in such a manner that the teeth are formed by a cutting action which progresses lengthwise of the blanks and also from the edge of the blanks toward the base of the finished teeth.

Another object is to provide a continuously operating machine for forming teeth in an indefinite number of saw blanks.

Another object is to provide a mechanism for delivering the blanks to the cutter in such manner that the teeth are successively formed by a cutting action which progresses from the edge of the blank toward the base of the teeth.

Another object is to provide improved means for feeding a blank through the cutting zone.

Another object is to provide improved means for adjustably supporting a cutter.

Another object is to provide an improved drive mechanism for a cutter, which will permit various adjustments of the cutter.

Other objects and advantages will hereinafter appear.

In practising the method of the present invention an indefinite number of blanks are successively subjected to the action of a continuously rotating cutter, having a series of spirally arranged milling teeth. The blanks are firmly clamped and advanced lengthwise in a direction transversely of the path of travel of the milling teeth, and in such manner that during the advance of the blanks the teeth cut deeper and deeper into the edge thereof, until saw teeth of full depth have been formed. The spiral arrangement of the milling teeth permit a continuous advance of the blanks during the cutting operation.

A more complete understanding of the method may be had from the following description of the construction and operation of a machine made in accordance with this invention.

A machine designed for carrying out the method is illustrated in the accompanying drawing.

The views of the drawings are as follows:

Figure 1 is a plan view of the machine showing in dotted lines the position of the cutter;

Fig. 2 is a longitudinal section through the machine, illustrating the manner of mounting the feed-drums. In this figure the cutting mechanism is illustrated in elevation;

Fig. 3 is a section on a somewhat larger scale taken on the line 3—3 of Fig. 1;

Fig. 4 is a section taken on the line 4—4 of Fig. 3;

Figs. 5 and 6 are a bottom plan and side elevation, respectively, of the cutter illustrating the progressive action thereof on the saw blanks;

Figs. 7 and 8 illustrate diagrammatically the respective positions of the blank with respect to the cutter as it enters and leaves the zone of cutting operation;

Fig. 9 is a fragmentary end elevation of the machine illustrating particularly the means for driving the various parts;

Fig. 10 is a horizontal section taken on line 10—10 of Fig. 9;

Fig. 11 is a horizontal section taken on line 11—11 of Fig. 9;

Fig. 12 is a vertical section taken on line 12—12 of Fig. 10.

The frame of the machine comprises a bed or table 10, having an upstanding bracket 11 for supporting the cutting mechanism to be hereinafter described. The bed or table 10 may be supported in any convenient manner.

A pair of rotatable feed drums 12 and 13 are mounted in spaced relation upon the table 10. Each drum is provided with a vertical peripheral wall 14 and a projecting annular flange 15, for receiving and supporting an endless feed-belt 16, which passes around the drums. The feed drum 12 is keyed to a spindle 17 mounted for rotation in a slidable bearing block 18, fitted in a slide way 19 formed in the top of the table 10. Suitable springs 20 interposed between the blocks and one end wall of the slide way press the block in such direction as to maintain proper tension in the feed-belt 16. The spindle 17 is retained in proper position in the block by any convenient means, such as a nut 21. A flat faced boss 22 projecting upwardly from the face of the table forms a broadfaced seat for the drum 12, and prevents a deviation of the drum from its normal plane of rotation.

The other drum 13 rests upon a broad seat afforded by an annular protuberance 23 projecting upwardly from the face of the table. This drum is keyed to and is driven by a stub-shaft 24 mounted for rotation in suitable fixed bearings 25 formed in the table. The stub-shaft 24 passes through the table and is provided at its lower end with a worm-gear 24' secured thereto.

Rotation is imparted to the worm-gear 25 and hence to the drum 13 by means of a worm 26 secured to one end of a driven shaft 27, mounted in suitable bearing brackets 28 extending from the under side of the table. The other end of this shaft extends through a suitable bearing 29 in the vertical wall of the machine bed or table, and is driven by means of gears 30, 31, from the vertical shaft 32.

The feed-belt 16 and feed drums 12 and 13 coöperate to form a simple and effective means for firmly clamping and carrying the saw blanks in properly clamped condition through the zone of the cutting operation. In order to deliver the blanks to this conveying mechanism, a blank supporting feed-table has been provided. The feed table preferably consists of a flat plate 33 supported in a horizontal position by means of a bracket 34 bolted or otherwise secured to the machine bed or table 10. As shown, the feed table extends parallel to the run of the belt, with the delivery end thereof immediately adjacent the peripheral wall of the feed-drum 13, at a point where the belt makes initial contact therewith.

The operation of the parts thus far described is as follows. A continuous rotation is imparted to the feed-drum from the shaft 32, through the gears 30, 31, shaft 21, worm 26, worm gear 25, and stub-shaft 24. This causes a continuous travel of the feed-belt 16, and consequent rotation of feed-drum 12. The blanks are positioned on edge on the plate 33, and are moved preferably one at a time until the advanced end thereof is pinched between the traveling belt and the feed-drum 13. Each blank is thus drawn from the plate and is carried lengthwise along a curved path through the zone of the cutting operation.

The belt is under such tension as to firmly clamp the blank in this curved condition against the peripheral wall of the drum. The belt is preferably made of a hard material such as spring steel. A soft steel ring 35 seated in an annular recess 36 in the peripheral wall of the drum serves as a backing for the blank during the cutting operation, the teeth of the cutter passing through the blank and through the upper front corner of this ring.

The height of the feed plate 33 is such that the blanks are delivered to the feed mechanism with the upper edge thereof substantially flush with the upper surface of ring 35. The feed belt is of such width however that its upper edge is not engaged by the cutter.

The cutting mechanism includes a continuously driven hob or formed helical cutter 37 mounted for rotation about a fixed axis. The cutter is preferably cylindrical in form, and is provided with a series of milling teeth spirally arranged around the periphery thereof. The cutter is preferably positioned immediately above the path of travel of the blanks, with its axis of rotation in a vertical plane substantially tangential to the periphery of the drum 13 as indicated in Fig. 1 of the drawing. Cutters of various shapes and sizes may be employed depending upon the character of the work to be produced. Furthermore the teeth may be arranged to form a single, double or triple thread.

Adjustable means is therefore provided for supporting the cutter in proper working position. This means may assume various forms. In the present instance, however, this means includes an L-shaped bracket 38 mounted for vertical adjustment upon the upstanding bracket 11, previously referred to. For this purpose bracket 11 is provided with vertically extending laterally projecting flanges 39, which fit in correspondingly shaped vertical grooves 40 in the vertical leg of the L-shaped bracket 38. A vertical adjusting screw 41 is rotatably fixed in a bearing plate 42 secured to the bracket 11, and is threaded through a nut 43 fixed to the bracket 38. The projecting end of this screw may be suitably fashioned to receive a convenient tool for rotating the screw to effect a vertical adjustment of the bracket.

As shown more particularly in Fig. 4 the under face of the L-shaped bracket 38 is provided with a horizontally extending dovetail projection 44 seated in a correspondingly shaped recess 44' in a plate 45. An adjusting screw 46 is employed to effect a horizontal adjustment of plate 45 relative to bracket 38, in a manner similar to the adjustment just described.

A vertical shaft 47 is rotatably supported by the plate 45. The shaft extends upwardly through an opening 48 formed near one end of the plate. As shown, the upper end 49 of this opening is somewhat enlarged to form a seat or shoulder for a lock washer 50 screwed onto the threaded end of the shaft. A jam-nut 51 may be employed to lock the washer in place.

A second plate 52 is supported beneath plate 45 for angular adjustment about the axis of shaft 47. This plate is provided near one end with a suitable bore to receive the shaft 47. A miter pinion 53 pinned or otherwise secured to the shaft holds this end of the plate in position. The other end of the plate 52 is provided with an ear 54 carrying a pin 55, which projects upwardly through an arcuate adjusting slot 56 (Fig. 1) in a flange 57 projecting from the plate 45. A nut 58 screwed onto the end of the pin supports this end of the plate 52 and firmly clamps the same in adjusting position. The nut 58 may be made integral with the pin 55 as a unitary cap screw having a reduced threaded shank screwing into the ear 54.

Suitable bearing brackets 59 and 60 extend downwardly from plate 52 to support the cutter spindle 61. Bearing bracket 59 is preferably cast integral with the plate, while bracket 60 is preferably removably attached thereto by means of a sliding dovetail connection 62. (Fig. 2.) The bracket may be secured against sliding movement by any convenient means such as a set screw. This construction permits ready removal of the bracket for purposes of assembly, and also permits adjustment of the parts, so that cutters of various lengths may be employed.

The cutter 37 is rigidly clamped on the spindle 61 between the collar 63 and the clamping sleeve 64 by means of a nut 65 threaded on the spindle. The spindle is driven by means of a miter pinion 66 secured thereto and meshing with the miter pinion 53 hereinbefore mentioned secured to shaft 47.

As previously pointed out, the upper end of shaft 47 is carried by the horizontally adjustable plate 45, which is, in turn, supported by the vertically adjustable bracket 38. Means is therefore provided for maintaining the lower end of the shaft in proper working position for any adjustment of the upper end thereof. In the present instance, this means includes a horizontally adjustable bearing block 67 mounted for sliding adjustment in the slot 68, formed in a suitable bracket 69, secured to the machine bed. One side of the slot is formed by a yielding arm 70 (see Figs. 10 and 11), which may be drawn into firm clamping engagement with the block by means of the clamp screw 71.

The shaft 47 is rotatably journaled in block 67 and is permitted longitudinal sliding movement therein. A pinion is supported in horizontal position upon a collar 73 resting upon the slide block 67, and is slidably keyed to the shaft 47.

Shaft 32 previously referred to is rotatably supported in a suitable bearing bracket 74 secured to the machine bed, and passes through a bearing in the bracket 69. A gear wheel 75 secured to this shaft is operably connected with the pinion 72 by means of the adjustably mounted intermediate gears 76 and 77. These gears are carried by a lever 78 mounted upon bracket 69, for angular adjustment about shaft 32 as its center. The smaller gear 76 constantly meshes with gear wheel 75 on shaft 32, irrespective of the position of the lever 78. The lever 78 is fixed in such adjusted position as to cause the larger gear 77 to mesh with pinion 72 on shaft 47. Such construction permits an operative driving connection between the shafts 32 and 47, no matter what position of adjustment is assumed by the latter shaft. Lever 78 is fixed in adjusted position by means of a bolt and nut connection 79 extending through the lever and through an arcuate slot 80 formed in the bracket 69.

A convenient means for mounting the gears 76 and 77 upon the lever is shown in detail in Fig. 12. The gears are keyed together by means of a sleeve 81, having a rib 82 projecting into a key-way in each of the gears. Sleeve 81 is mounted for rotation upon a spacing sleeve 83. The parts are held in assembled relation upon the lever 78 by means of a bolt and nut connection 84, passing through the sleeve 83 and through an adjusting slot 85 in the lever. The purpose of the slot is to permit adjustment of the gears 76 and 77 toward and from the gear wheel 75, so that gears of varying sizes may be employed. Thus the proper gear ratio may be obtained between the shafts 32 and 47. An additional slot 86 is shown in the lever 78 to take the gear supporting bolt 84, in case a very large gear 77 is employed. This affords a very broad range of adjustment of the parts.

The operation of the entire mechanism will now be briefly described. The cutter supporting plate 52 is angularly adjusted, and plate 45 horizontally adjusted, to bring the axis of the cutter in a vertical plane tangential to the path of the work at a point immediately beneath the far end of the cutter (see Fig. 1). The L-shaped bracket is then vertically adjusted to gage the depth of the cut.

Power is then delivered to the machine through shaft 47 from any convenient source causing rotation of the cutter in a clockwise direction (Fig. 2) and rotation of feed drum 13 in a counterclockwise direction (Fig. 1). The blanks are then withdrawn one at time by the action of the feed belt and drum and advanced lengthwise beneath the rotating cutter along the curved path defined by the periphery of the drum. The speed at which the blanks advance is dependent upon the gear ratio between shaft 47 and 32 and is made to correspond with the spiral advance of the cutting teeth during the rotation of the cutter.

During the advance of each blank, it enters beneath the cutter in a position offset from the axis thereof, as indicated in Figs. 5, 6, and 7. At this point the cutting teeth engage only the extreme upper edge of the blank. During its lengthwise progress, however, the blank gradually approaches a position immediately beneath the axis of the cutter (Fig. 8), and the cutting action consequently progresses deeper and deeper into the edge of the blank until full depth teeth are formed. The position of the blank relative to the cutter at the point where it is about to leave the cutter, is indicated in Fig. 8.

It is obvious that many changes may be made in the method above outlined and in the machine hereinbefore described, without departing from or sacrificing any of the advantages of the present invention, as defined in the claims appended hereto.

I claim:

1. The method of forming teeth in hacksaw blades and the like, which consists in firmly clamping the blade in position with one edge thereof exposed, moving the blade lengthwise while in the clamped condition, and during such lengthwise movement forming successive notches in the exposed edge thereof to form teeth of the desired shape, the path of movement of the blade being such that the notch forming operation progresses from the outer edge of the blade toward the base of the finished teeth.

2. The method of forming teeth in hacksaw blades and the like, which consists in firmly clamping the blade in a curved condition with one edge exposed, causing a lengthwise advance of the blade while in such curved condition, and forming successive notches in the exposed edge thereof while the blade is in motion to form teeth of the desired shape, the path of movement of the blade being such that the notch forming operation progresses from the outer edge of the blade toward the base of the finished teeth.

3. The method of forming teeth in hacksaw blades and the like, which consists in causing the blade to travel in a lengthwise direction along a curved path, firmly clamping the blade during its lengthwise travel, and cutting successive notches in the edge thereof to form teeth of the desired shape, by a cutting operation, which progresses from the edge of the blade toward the base of the finished teeth.

4. In a machine for forming teeth in hacksaw blades and the like, the combination of a teeth-forming member, of a mechanism for continuously moving a succession of saw blades longitudinally past said teeth forming member to successively and progressively present the longitudinal edges of said blades to the action of said teeth forming member.

5. In a machine of the class described, the combination of a continuously rotating milling cutter, and continuous conveyer means for supporting saw blades end to end to deliver them one at a time to the action of said milling cutter.

6. In a machine of the class described, the combination of a continuously rotating milling cutter having teeth spirally arranged, of continuous conveyer mechanism for firmly clamping a plurality of saw-blanks end to end and moving the same continuously in a direction longitudinally of the cutter and toward the axis of rotation thereof, so as to present the longitudinal edges of the blanks to the progressive action of the cutter.

7. In a machine of the class described, the combination of a mechanism for firmly clamping a saw-blank and advancing the same along a curved path, a continuously rotating milling cutter having cutting teeth spirally arranged, and means for supporting said milling cutter in position with its axis of rotation in a vertical plane tangential to the path of movement of the saw blanks, so that the action of said cutter progresses from the extreme outer edge of the blank toward the base of the finished teeth.

8. In a machine for cutting teeth in saw blanks, the combination of a hob having a series of spirally arranged milling teeth, means for effecting a relative longitudinal movement between said hob and a saw blank, and means for rotating said hob to cut teeth in the edge of the blank during such relative movement.

9. In a machine for cutting teeth in saw blanks the combination of a rotatable hob having a series of spirally arranged milling teeth, means for causing a lengthwise advance of a blank along a definite path, means for supporting said hob with its milling teeth extending across said path and means for rotating said hob during the advance of said blank to cut teeth in the edge thereof.

10. In a machine for cutting teeth in saw blanks the combination with a teeth-forming member of an endless conveyer for presenting the blanks successively to the action of the teeth-forming member.

11. In a machine of the class described, the combination of a hob for cutting teeth in saw blanks, mechanism for advancing the blanks lengthwise of said hob, means for rotating said hob, and means connected with said first named means for actuating said mechanism to advance the blanks at a speed corresponding to the speed of rotation of said hob.

12. In a machine of the class described the combination of a holder for a saw blank, mechanism for cutting notches in the blank to form saw teeth, and a support for said mechanism including means for vertically adjusting said mechanism, means for horizontally adjusting said mechanism, and means for angularly adjusting said mechanism.

13. The combination of a rotating milling cutter, mechanism for presenting blanks to the action of said cutter, a drive shaft for said cutter, adjustable means for supporting said cutter and said drive shaft, means for actuating said blank presenting mechanism, and adjustable means for operatively connecting said actuating means with said shaft at any position of adjustment of said shaft.

14. The combination of a hob for forming teeth in saw blanks, mechanism for presenting blanks to the action of said hob, means for rotating said hob, and means for actuating said blank presenting mechanism, said means including interchangeable gearing operatively connected with said first named means whereby the speed of advance of the blanks may be controlled.

15. In a machine for forming teeth in hack-saw blades and the like, the combination with means for clamping a blade and feeding the same in a lengthwise direction along a predetermined path, of a teeth forming member operable during the advance of the blade to form successive teeth in the edge thereof by an action which progresses from the edge of the blade toward the base of the finished teeth.

In witness whereof, I hereunto subscribe my name this 3d day of April, A. D. 1919.

SWAN O. BJORNBERG.